2,998,283
WHEEL COVER
George Albert Lyon, 13881 W. Chicago Blvd., Detroit 28, Mich.
Filed Jan. 24, 1957, Ser. No. 636,077
1 Claim. (Cl. 301—37)

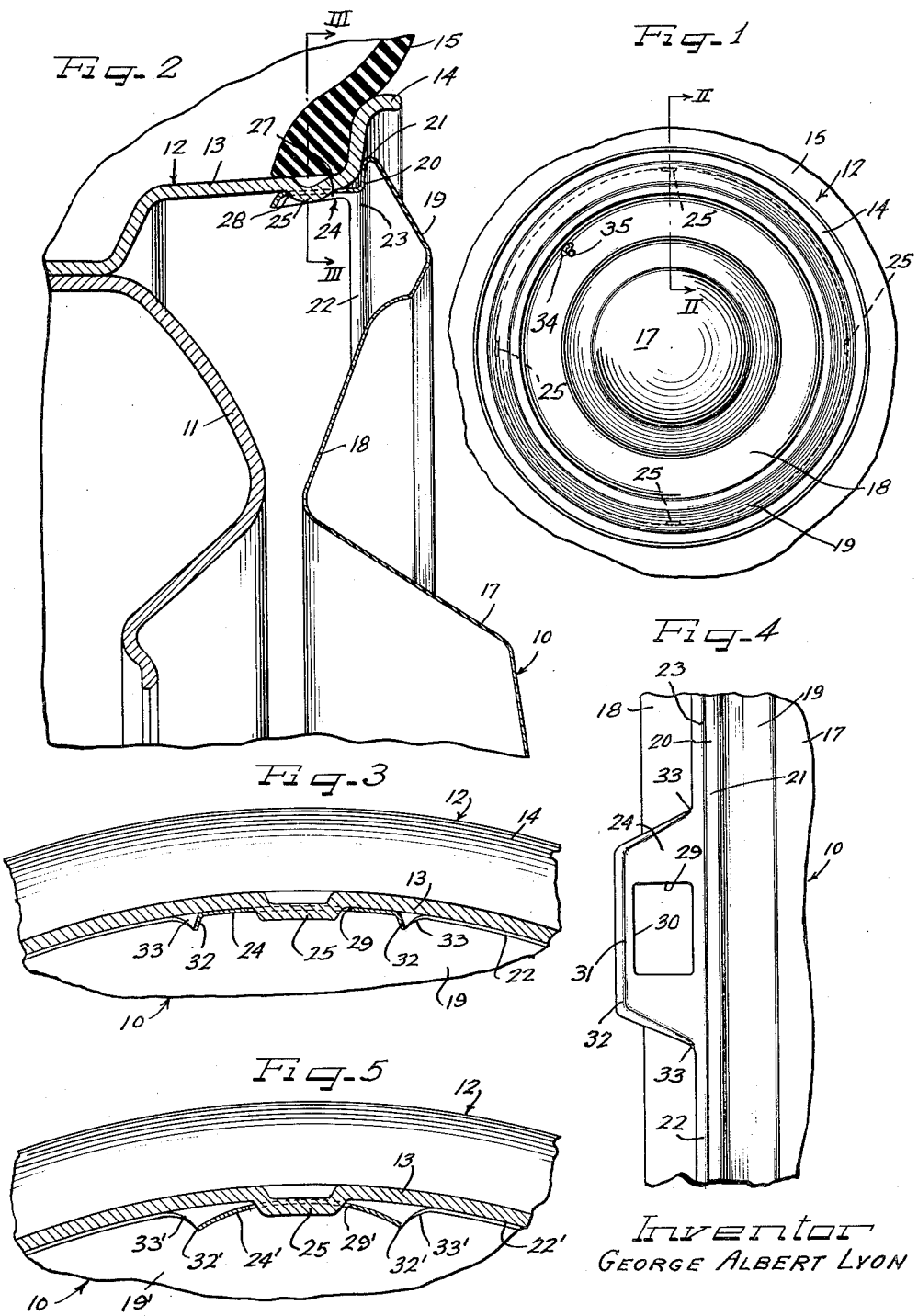

The present invention relates to improvements in wheel structures and more particularly concerns the ornamental and protective covering of the outer sides of vehicle wheels.

An important object of the present invention is to provide a wheel structure wherein improved retaining means are provided for a wheel cover.

Another object of the invention is to provide a wheel cover having novel cover retaining finger structure for snap-on, pry-off engagement with retaining bumps on the wheel.

A further object of the invention is to provide an economical wheel cover structure in that it is adapted to be made from a minimum sheet metal blank and fairly small retaining flanges or fingers thereon are effectively engageable with retaining bumps on a tire rim.

Other objects, features and advantages of the present invention will be readily apparent from the following detailed description of certain preferred embodiments thereof taken in conjunction with the accompanying drawing, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is a fragmentary sectional detail view taken substantially on the line III—III of FIGURE 2;

FIGURE 4 is a fragmentary edge elevational view of the cover of FIGURE 2; and

FIGURE 5 is a fragmentary sectional elevational detail view similar to FIGURE 3 but showing a modification.

A wheel cover 10 embodying features of the invention is constructed and arranged to be disposed in covering relation at the outer side of a vehicle wheel such as an automobile wheel including a disk spider wheel body 11 supporting a multi-flange, drop center tire rim 12 including an intermediate annular radially inwardly facing and generally axially outwardly directed slightly radially outwardly slanting or oblique intermediate flange 13 which joins a generally radially outwardly and then axially outwardly turned terminal flange 14. A pneumatic tire 15 is adapted to be supported by the tire rim.

In the present instance, the wheel cover 10 is constructed as a full sheet metal disk adapted to cover not only the wheel body 11 but also the tire rim 12, although it will be appreciated that if preferred, the cover 10 may be a two-part construction wherein a central hub cap type of cover is cooperable with a radially outer annular cover member but in the assembly in effect provides a full cover for the wheel. By preference, the cover 10 is made from suitable work hardenable, readily drawn sheet material such as suitable gauge stainless steel, brass or the like plate or strip. In the present instance, the cover 10 is a one-piece disk including a central axially outwardly projecting crown portion 17 about which is an intermediate annular generally dished portion 18 which at its radially outer side joins an annular marginal cover portion 19 in the present instance of generally ribbed form and adapted to overlie the tire rim.

At its outer extremity, the marginal cover portion 19 has an underturned generally radially inwardly directed reinforcing and finishing flange 20 which is also adapted to seat against the tire rim and more particularly the radially inner portion of the terminal flange 14 in the assembly with the wheel. Juncture of the underturned flange 20 with the marginal cover portion 19 provides a smooth reinforcing and finishing bead-like terminus or edge 21 for the cover. In addition to the radially extending portion thereof, the underturned flange 20 has a short axially inwardly extending angular extremity flange portion 22 which by virtue of its angular juncture 23 with the flange portion 20, substantially reinforces and stiffens the underturned flange structure which it will be observed through this arrangement is of generally L-shaped cross-section, and with the axially inwardly turned flange portion 22 of a diameter to extend about the juncture of the intermediate flange 13 with the terminal flange 14.

For press-on, pry-off retention of the cover 10 on the wheel, the cover is provided behind the marginal portion 19 with cover retaining fingers 24 comprising integral one-piece extensions from the cover marginal flange portion 22. In the present instance, there are four of the fingers 24 corresponding to and engageable with four cover retaining bumps 25 provided on the intermediate flange 13 and more particularly by embossment to project generally radially inwardly from the axially outer portion of the intermediate flange. As will be observed on inspection of FIGURES 2 and 3, each of the retaining bumps 25 is of substantial width in a circumferential direction and is provided with a generally radially inwardly and axially outwardly facing lead-in cam surface 27 and a generally radially and axially inwardly directed retaining shoulder surface 28.

Each of the retaining fingers 24 has a generally axially inwardly extending body portion which is an integral one-piece extension from the axial flange portion 22 and is of a width to extend to a limited extent beyond opposite sides of a central bump clearing socket in the present instance in the form of a circumferentially elongated aperture 29 dimensioned as to width slightly greater than the base width of the retaining bumps 25 and of a depth, that is axial dimension, slightly greater than the corresponding dimension of the retaining bumps and provided at the axially inner side of the socket aperture with a bump engaging shoulder 30 axially inwardly beyond which the inner terminal portion of the finger extends to provide substantial reinforcing bar 31 in support of the bump engaging shoulder 30. By preference, the respective opposite sides of the retaining finger body flare toward juncture with the edge of the axially extending flange portion 22 for thereby making the finger bodies of substantial mass and thus resistance to bending toward and at juncture with the underturned flange structure.

Substantial reinforcement and resiliency stiffening of each of the retaining fingers 24 is afforded by providing the same about its entire margin, inclusive of the side margins and the inner terminal margin with an inturned reinforcing flange 32. Along the inner terminal portion of the finger this substantially stiffens the inner end cross bar 31 against buckling resilient distortions, while at the sides of the fingers the reinforcing flange 32 substantially stiffens the finger against bending about a transverse axis, that is through the elongated dimension of the bump receiving socket aperture 29. It will be observed that the axially outer extremities of the reinforcing flange 32 merge into the axially extending flange portion 22 at truss-like stiffening junctures 33. Thereby, the retaining finger extensions are effectively connected into the underturned flange structure 20, 22 in a manner to utilize the stiffly resilient flexibility of the underturned flange structure in resisting radial deflection of the retaining fingers.

In applying the cover to the outer side of the wheel, valve stem aperture 34 in the dished cover portion 18 is registered relative to a valve stem 35, and thereby the retaining fingers 24 are aligned with the retaining bumps 25 of the tire rim. Since the retaining fingers 24 extend toward their tips to a slightly larger diameter than the axially outer portion of the intermediate flange 13 to be opposed in assembly thereby, a tensioned radially outwardly thrusting, facewise abutting relation of the retaining fingers against the rim flange 13 will be effected with the retaining fingers under resilient tension as compressed to the smaller diameter of the engaged portion of the rim flange.

Incident to registration of the valve stem aperture 34 with the valve stem 35, the two adjacent retaining fingers 24 may be brought into generally axially inward and radially outward canted approach assembly with the respective retaining bumps 25 nearest the valve stem, thereby generally locating the retaining bumps in the respective retaining bump apertures 29 of the associated fingers. Then, in the final assembly manipulation of the cover, the diametrically opposite side of the cover is pressed axially inwardly to thereby snap the remaining retaining fingers over the remaining retaining bumps. In so doing, such retaining fingers cam at their terminal turned-in flange portions 32 against the lead-in cam surfaces 27 of the associated retaining bumps and thereby effect resilient radially inward deflectional springing of the retaining fingers until the respective retaining shoulders 30 of the retaining fingers snap behind the retaining bumps onto the retaining shoulders 28 thereof. The deflectional resilient tension to which the fingers are subjected causes the same to thrust facewise radially outwardly and thus cam the shoulders 30 toward the bases of the retaining bump shoulders 28 and thereby draw the underturned flange 20 of the cover into firm seating relation against the shoulder provided by the inner portion of the terminal flange 14 of the tire rim.

Since the retaining fingers abut the intermediate flange 13 of the tire rim, the cover is maintained in effectively stable condition with respect to any tendency to deflect diametrically in the presence of road shocks or other transverse forces thereagainst. Should the transverse force or forces be of such magnitude as to tend to cause yielding of the retaining fingers, then the axially extending flange portion 22, since it is close to the rim shoulder, will prevent any appreciable diametrical displacement of the cover.

It should also be observed that since the side edges defining the retaining bump apertures 29 closely approach in ample clearance relation the sides of the retaining bumps 25, any tendency of the cover to turn on the wheel is effectively precluded so that twisting of the valve stem 35 will be avoided.

Removal of the cover from the wheel is readily effected by applying a pry-off tool such as a screwdriver behind the turned extremity of the cover, that is behind the finishing edge shoulder 21 and the underturned flange 20 and applying pry-off force, especially in line with the retaining fingers or any selected retaining finger 24 and exerting pry-off leverage to cause the retaining finger or fingers adjacent the application of pry-off force to spring inwardly by camming of the retaining shoulders 30 thereof outwardly along the retaining shoulders 28 of the respective retaining bumps 25 until the fingers snap free from the retaining bumps. It may be observed that since the axially extending cover flange portion 22 is relatively short and the underturned inwardly extending flange portion 20 is also short, so that after initial application of the pry-off tool behind the underturned flange portion 20 and initiation of pry-off leverage, access of the tip of the pry-off tool will be had to the edge of the axially extending flange portion 22 serving as a pry-off shoulder for further and final pry-off leverage.

In the modification of FIGURE 5, details of the wheel itself are substantially the same as the wheel in FIGURES 2 and 3 and therefore identical reference numerals identify identical parts. In addition, a cover 10' to be applied to the outer side of the wheel may embody features substantially the same as the cover 10 and therefore common or substantially related features of the cover 10' are identified by similar, primed, reference numerals. In this particular form of the cover, turned marginal flanges 32' on the retaining fingers 24' are wing-like side margins of a substantially arcuately transversely cross-sectioned retaining finger, the radius of curvature of which is substantially less than the radius of curvature of the circumference of the cover, and more particularly of the axially inturned flange portion 22'. It will be observed that the side turned marginal flange portions 32' of the cover are joined to the flange portion 22' by the strut-like reinforcing and joining portions 33'. At the tips of the retaining fingers 24', the marginal flange structure 32' may be substantially the same as shown in the form of the cover depicted in FIGURES 2 and 4. Functioning of the fingers 24' of the cover 10' is substantially the same as described in connection with the fingers 24 and it may be understood that the fingers are interchangeable.

It will be understood that modifications and variations may be effected without departing from the scope of the novel concepts of the present invention.

I claim as my invention:

In a wheel structure including a tire rim having a radially inwardly facing annular flange with a shoulder facing generally axially outwardly at the axially outer side thereof and circumferentially spaced radially inwardly projecting retaining bumps with radially and axially inwardly facing retaining shoulders disposed in circumferential alignment on the axially outer portion of said rim flange, a cover for disposition at the outer side of the wheel including a circular cover body having an annular marginal portion for overlying the tire rim and provided with an underturned radially inwardly extending flange structure for seating on said first mentioned shoulder, said underturned flange structure including a radially inner portion providing an axially inwardly extending narrow flange disposed adjacent to the axially outer extremity portion of said rim flange for limiting any tendency toward radial displacement of the cover due to road shocks or radial displacement forces applied to the cover, said narrow flange having generally axially inwardly extending cover retaining fingers for facewise tensioned abutment against the rim flange and having cover retaining sockets therein with retaining shoulders on the axially inner sides of the sockets engageable retainingly with the retaining bump shoulders, said fingers having generally axially extending sides and having side marginal flange reinforcement projecting generally radially inwardly and substantially stiffening the same against radial deflection and enhancing the radially outward resilient thrust of the fingers against the rim flange resulting from radially inward compression of the fingers incident to application of the same to the rim flange for holding the cover in place, said retaining fingers having the axially inner extremities thereof turned inwardly to provide cam surfaces engageable with the bumps in camming the fingers over the bumps on pressing the same axially inwardly into engaged relation with the bumps and joining said marginal flange reinforcement to enhance reinforcement of the fingers.

References Cited in the file of this patent
UNITED STATES PATENTS

| | | |
|---|---|---|
| 2,624,627 | Lyon | Jan. 6, 1953 |
| 2,624,628 | Lyon | Jan. 6, 1953 |
| 2,624,640 | Lyon | Jan. 6, 1953 |
| 2,631,895 | Hunt | Mar. 17, 1953 |
| 2,860,923 | Lyon | Nov. 18, 1958 |